US007946518B2

(12) United States Patent
Patzelt et al.

(10) Patent No.: US 7,946,518 B2
(45) Date of Patent: May 24, 2011

(54) GRINDING ROLLER AND METHOD FOR THE RECONDITIONING THEREOF

(75) Inventors: Norbert Patzelt, Beckum (DE); Johann Knecht, Wadersloh (DE); Herbert Pingel, Wadersloh (DE)

(73) Assignee: Polysius AG, Beckum (DE)

( * ) Notice: Subject to any disclaimer, the term of this patent is extended or adjusted under 35 U.S.C. 154(b) by 78 days.

(21) Appl. No.: 12/515,295

(22) PCT Filed: Mar. 26, 2008

(86) PCT No.: PCT/EP2008/053559
§ 371 (c)(1), (2), (4) Date: May 18, 2009

(87) PCT Pub. No.: WO2008/125445
PCT Pub. Date: Oct. 23, 2008

(65) Prior Publication Data

US 2010/0059614 A1 Mar. 11, 2010

(30) Foreign Application Priority Data

Apr. 17, 2007 (DE) ........................ 10 2007 018 090

(51) Int. Cl.
*B02C 4/30* (2006.01)
*B23P 6/00* (2006.01)

(52) U.S. Cl. .......................... 241/293; 29/895.1; 492/30

(58) Field of Classification Search .................. 241/293, 241/294; 29/895.1, 895.21; 492/28, 30, 492/36
See application file for complete search history.

(56) References Cited

U.S. PATENT DOCUMENTS

| | | | | |
|---|---|---|---|---|
| 412,558 | A * | 10/1889 | Stephens | 241/294 |
| 3,412,946 | A * | 11/1968 | Gabler et al. | 241/293 |
| 5,269,477 | A | 12/1993 | Buchholtz et al. | |
| 5,954,282 | A | 9/1999 | Britzke et al. | |

FOREIGN PATENT DOCUMENTS

| | | |
|---|---|---|
| CA | 2202213 | 11/1997 |
| DE | 10 2006 028 546 | 12/2007 |
| JP | 2001 165146 | 6/2001 |

* cited by examiner

*Primary Examiner* — Faye Francis
(74) *Attorney, Agent, or Firm* — Gifford, Krass, Sprinkle, Anderson & Citkowski, P.C.

(57) ABSTRACT

The invention relates to a milling roller of a high-pressure material bed roller mill, having profile-members which are embedded with a portion of the length thereof in holes of the roller body and, with the remainder of the length thereof, protrude above the surface of the roller body, with, when the milling roller is new, the holes having different depths and the profile-members having different lengths in differently loaded part-regions of the width of the roller body. Such a construction brings about a long service-life for the roller and cost-effective reconditioning after operational wear with a production operation which reduces costs.

7 Claims, 2 Drawing Sheets

GRINDING ROLLER AND METHOD FOR THE RECONDITIONING THEREOF

FIELD OF THE INVENTION

The invention relates to a milling roller of a high-pressure material bed roller mill in accordance with the preamble of claim 1 and a method for reconditioning a used milling roller of this type.

BACKGROUND OF THE INVENTION

Milling rollers of the type set out above are known, for example, from EP 0 516 952 B1. They contain a plurality of wear-resistant profile-members which are embedded with a portion of the length thereof in holes of the roller body and protrude with the remainder of the length thereof above the surface of the roller body. When such rollers are operated, the intermediate spaces between the protruding profile-members are filled with the comminution material which is supplied to the material bed roller mill and which therefore provides a degree of autogenous wear protection for the surface of the roller body.

In the course of the operating time, both the protruding profile-members and the surface of the roller body are subject to unavoidable wear which makes reconditioning the milling roller necessary if the roller body is intended to be used further.

DE 196 18 143 A1 discloses a milling roller, wherein the hardness of the material of the roller body forming the roller surface is greater than 56 HRc (Rockwell hardness). This milling roller is used in comminution operation until a substantial portion of all the profile-members has become completely worn and/or has fallen out of the roller body. The reconditioning of the used milling roller is then carried out in such a manner that the roller surface has a cylindrical shape conferred on it again by complete turning of the profile-members and the original holes, after which new holes are produced and new profile-members are introduced into those holes.

Although it is possible in this known solution for the surface to wear substantially only to the same extent as the protruding profile-members by using an extraordinarily hard base material for the surface of the roller body, the complete turning of the surface of the roller body provided with holes involves substantial complexity owing to the great hardness of the surface material when a used milling roller of this type is reconditioned.

A prior German patent application (DE 10 2006 028 546 A1) further relates to a method for reconditioning a used milling roller of a high-pressure material bed roller mill, containing a plurality of profile-members which are embedded with a portion of the length thereof in holes of the roller body and, with the remainder of the length thereof, protrude above the surface of the roller body, with the profile-members having greater hardness than the surface of the roller body and the protruding portion of the profile-members and the surface of the roller body being at least partially worn. In this method for reconditioning, after the worn profile-members have been removed, the worn surface of the roller body is turned at least in a part-region of the width of the roller body as far as a diameter which is greater than the diameter of the base of the holes provided, after which a) the holes provided are extended as far as a depth which is sufficient to receive new profile-members, b) and/or new holes are produced in accordance with a new hole configuration, c) and/or shorter profile-members are introduced into the holes which are now shorter.

SUMMARY OF THE INVENTION

The problem addressed by the invention is to construct a milling roller in accordance with the preamble of claim 1 in such a manner that a long service-life of the roller is achieved and a cost-effective reconditioning operation is made possible after operational wear with a production operation which reduces costs.

This problem is solved according to the invention by the characterising features of claim 1. Claims 4 and 7 relate to two variants of the method according to the invention for reconditioning the milling roller according to the invention. The dependent claims 2, 3, 5 and 6 relate to advantageous configurations of the invention.

Expenditure during production in terms of time and materials is concentrated to a greater extent in the part-regions which are particularly highly loaded during subsequent operation in that the roller according to the invention has holes of different depths and profile-members of different lengths in differently loaded part-regions of the width of the roller body, that is to say, in that in particular the holes and profile-members in the highly loaded central part-region of the width of the roller body have a greater depth or length than in the peripheral regions of the width of the roller body which are loaded to a lesser degree. A significant increase in the service-life of the roller, that is to say, the period of time before reconditioning becomes necessary, is thereby achieved with cheaper production.

The reconditioning of a used roller according to the invention can advantageously be carried out in such a manner that the worn surface of the roller body is turned only in part-regions of the width of the roller body and, after the original holes have been made deeper, profile-members are re-introduced. In this manner, a very cost-effective reconditioning operation is achieved.

That reconditioning is preferably carried out in that part-region in which the shortest holes and profile-members were provided when the roller was new. Since, at this time of partial reconditioning, other part-regions which have been provided with longer holes and profile-members during the original production operation are still completely operational in spite of operational wear, the necessary reconditioning of the roller is minimised and therefore achieved overall with reduced expenditure.

In the context of the invention, however, it is also possible to construct the holes in the peripheral regions of the width of the roller body when the milling roller is new so as to have a depth which is subsequently sufficient, after those peripheral regions have become worn, to be able to introduce profile-members of sufficient length after the worn peripheral regions have been turned without subsequent deepening of the holes.

BRIEF DESCRIPTION OF THE DRAWINGS

The invention is schematically illustrated in the drawings, in which.

DETAILED DESCRIPTION OF THE INVENTION

Figure 1:
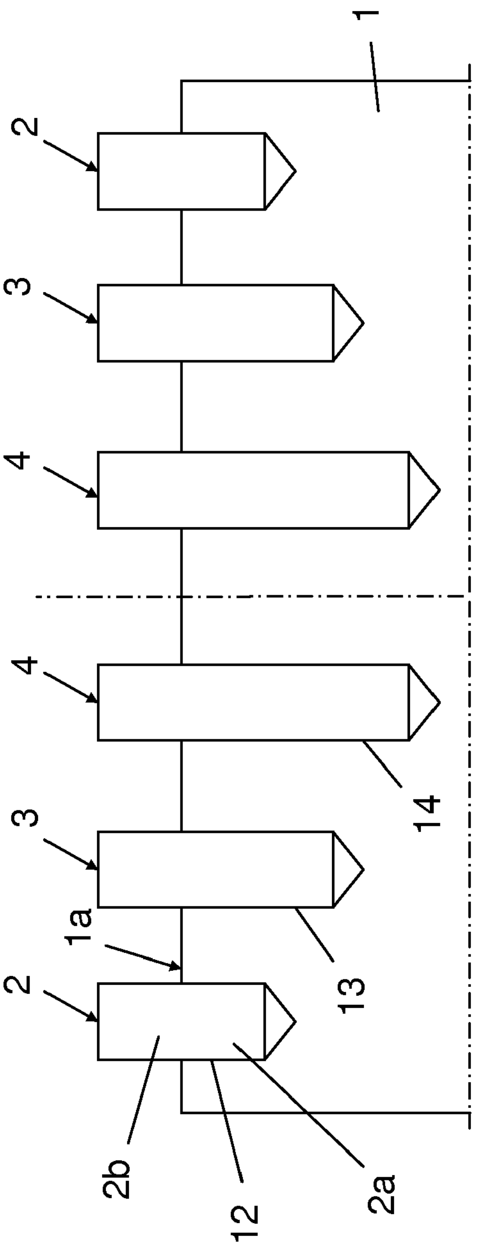
FIG. 1 is a schematic longitudinal part-section through a first embodiment of a roller according to the invention in the new state.

The roller body 1 of the milling roller of a high-pressure material bed roller mill, which milling roller is schematically illustrated in FIG. 1 in the new state, contains a plurality of profile-members 2, 3, 4 which are embedded with a portion of the length thereof (for example, 2*a*) in holes 12, 13, 14 of the roller body 1 and protrude with the remainder of the length thereof (for example, 2*b*) above the surface la of the roller body 1.

When the milling roller is new, the holes 12, 13, 14 have different depths in individual part-regions of the width of the roller body. Accordingly, the profile-members 2, 3, 4 are constructed in those part-regions so as to have different lengths.

In the above-mentioned different part-regions of the width of the roller body, the profile-members 2, 3, 4 and the surface la of the roller body 1 are loaded to different degrees during operation of the high-pressure material bed roller mill. As a result, there is generally produced a higher load in the central part-region of the width of the roller body (that is to say, in the part-region in which the long profile-members 4 and the long holes 14 are provided) and accordingly greater wear than in the peripheral regions of the roller body (that is to say, in the part-regions in which the short profile-members 2 and the short holes 12 are provided).

Figure 2:
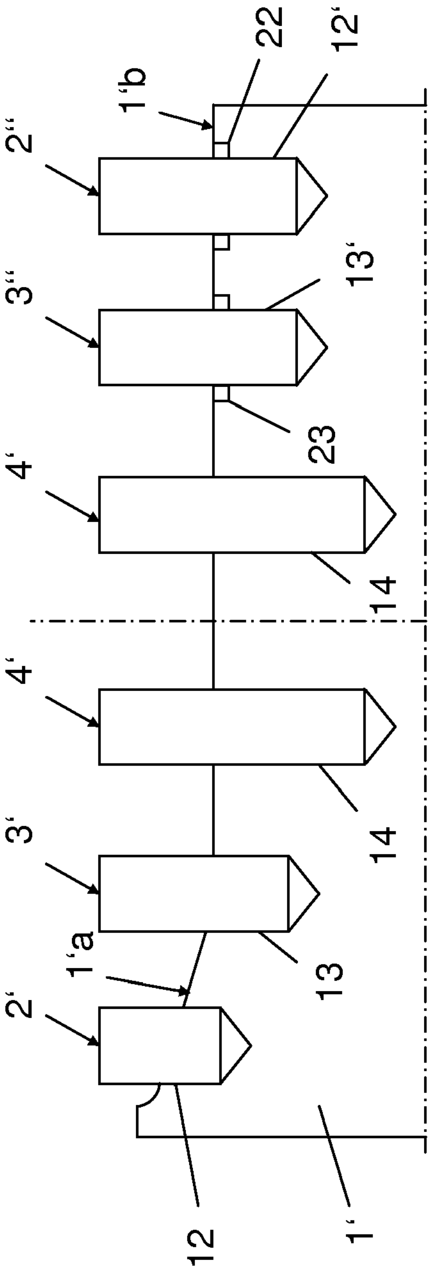
FIG. 2 is a schematic longitudinal part-section which shows, in the left-hand half of the illustration, the wear state reached after a given operating time and, in the right-hand half of the illustration, the state of the roller according to FIG. 1 after reconditioning.

The left-hand half of FIG. 2 shows the state of the milling roller which is produced after a given operating time owing to the wear which has occurred at the surface of the roller body 1' and at the profile-members 2', 3', 4'. The length of all the profile-members has been reduced slightly. The surface 1'*a* is worn only by a small amount in the peripheral region (that is to say, in the zone of the profile-members 2'), but substantially more in the central region of the roller body (that is to say, in the zone of the profile-members 4'). Nevertheless, the profile-members 4' in the central region of the roller body are also still anchored sufficiently in the long holes 14 for further wear. However, the roller requires reconditioning in the outer peripheral regions, in which the profile-members 2' are still retained only in holes 12 which have become very shallow.

The right-hand half of FIG. 2 shows the state of the milling roller after the reconditioning operation. During that reconditioning, the worn surface of the roller body is turned in individual part-regions, in particular in the peripheral regions, after the profile-members 2' and 3' provided at that location have been removed, to such an extent that the desired, substantially cylindrical shape of the surface 1'*b* is produced again (with a diameter which is reduced in comparison with the diameter of the original surface 1*a*, cf. FIG. 1).

Subsequently, the holes 12', 13' in the turned part-regions of the roller body are first provided with counter-sinkings 22, 23 and are subsequently recessed to such an extent that they can again receive profile-members 2", 3". Those profile-members 2", 3" may be either partially worn profile-members of sufficient length of another part-region of the roller body involved in the reconditioning operation, or new profile-members may be introduced.

Figure 3:
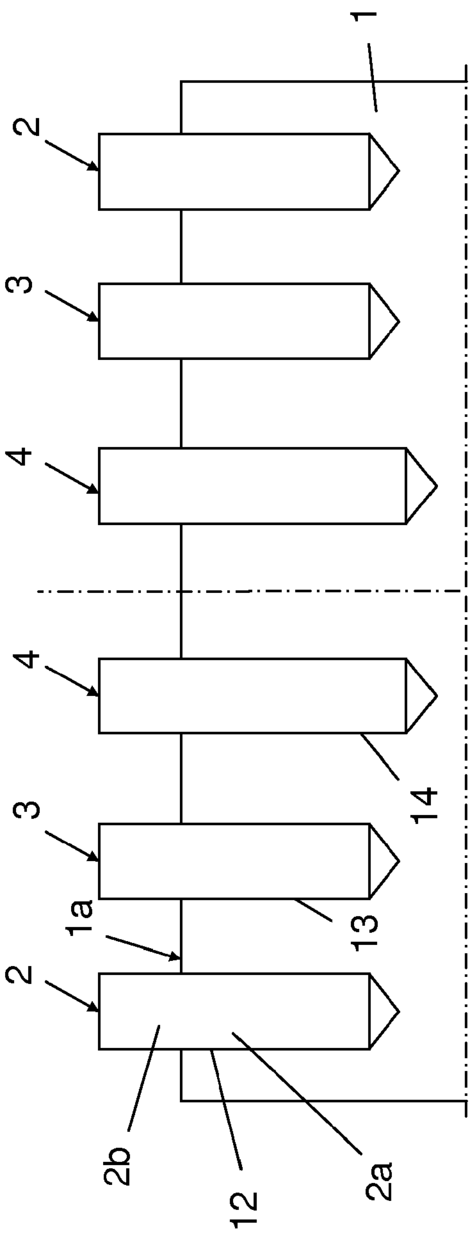
FIG. 3 is a longitudinal part-section through a second embodiment of a roller according to the invention in the new state.
Figure 4:
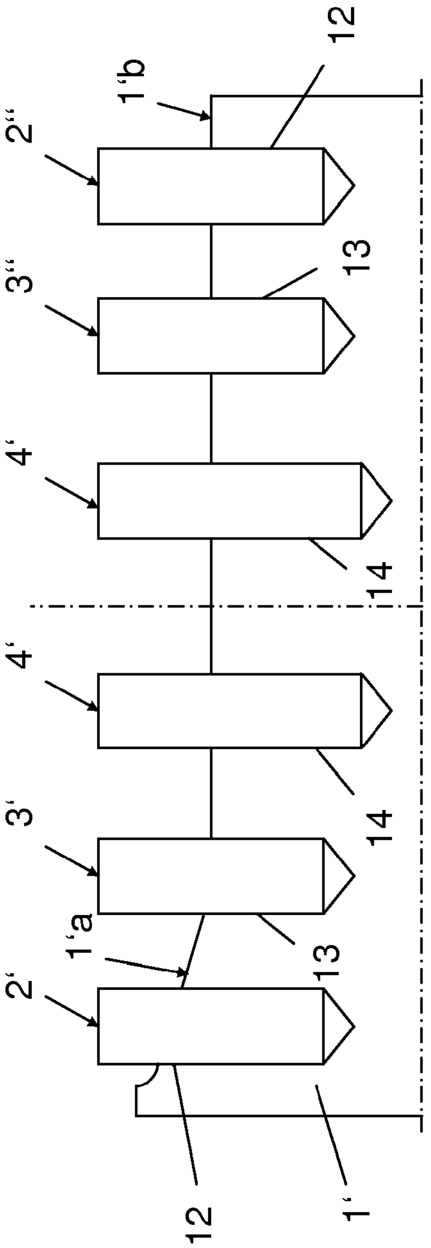
FIG. 4 is a schematic longitudinal part-section which shows, in the left-hand half of the illustration, the wear state which is reached after a given operating time and, in the right-hand half of the illustration, the state of the roller according to FIG. 3 after reconditioning.

In the embodiment according to FIG. 3 and FIG. 4, the holes 12, 13 in the peripheral regions of the roller body 1 when the roller is new (FIG. 3) are constructed so as to have increased depth. When the roller is worn (on the left in FIG. 4), the processing is carried out in such a manner that, firstly, the profile-members (2', 3') in the peripheral regions are removed and the worn surface 1'*a* of those peripheral regions is levelled by turning. As a result, a new surface 1'*b* is produced (cf. FIG. 4, on the right). Subsequently, profile-members 2", 3" are introduced into the holes 12, 13 of the peripheral regions which were originally constructed with increased length, without the holes 12, 13 having to be made deeper for that purpose. The profile-members 2", 3" have a length which is shorter than the length of the profile-members 2, 3 when the roller is new (cf. FIG. 3). Those profile-members 2", 3" may be either new profile-members or worn profile-members which have been removed from other part-regions of the roller when the roller was reconditioned.

The invention claimed is:

1. A milling roller of a high-pressure material bed roller mill, comprising:
- a roller body with a surface having holes, and
- a plurality of profile-members embedded with a portion of their length in said holes of said roller body and,
- with a remainder of their length, protruding above said surface of said roller body,
- wherein in a new condition of said milling roller said holes having different depths and said profile-members having different lengths in regions of said roller body surface subjected to different wear.

2. The milling roller according to claim 1, characterised in that holes and profile-members in a central part-region of a width of the roller body have a greater depth or length than holes and profile-members in peripheral regions of said width of said roller body.

3. The milling roller according to claim 1, characterised in that the holes in peripheral regions of a width of said roller body have, when the milling roller is new, a depth sufficient to receive profile-members when said peripheral regions are worn.

4. A method for reconditioning a used milling roller of a high-pressure material bed roller mill, comprising:
- providing a used milling roller having a roller body with a surface having holes and containing a plurality of profile-members which are embedded with a portion of their length in the holes of the roller body and, with the remainder of their length protruding above the surface of the roller body and holes in differently loaded part-regions of a width of the roller body having different depths and the profile-members having different lengths when the milling roller was new, and the protruding portion of the profile-members and the surface of the roller body being at least partially worn;
- turning the worn surface of the roller body after worn profile-members in a part-region have been removed to such an extent that a desired shape of the roller body is produced;
- deepening the holes in the turned part-region of the roller body to such an extent that the deepened holes can receive profile-members; and
- placing partially worn profile-members from another part-region of the roller body that is involved in the reconditioning and/or new profile-members into the deepened holes.

5. The method according to claim 4, characterised in that turning the worn surface of the roller body occurs at least in that part-region of the width of the roller body in which shortest holes and shortest profile-members were provided when the milling roller was new.

6. The method according to claim 4, further including counter-sinking holes after turning the worn surface of the roller body and before deepening the holes.

7. A method for reconditioning a used milling roller of a high-pressure material bed roller mill, comprising:

providing a used milling roller having a roller body with a surface having holes and containing a plurality of profile-members having different lengths and which are embedded with a portion of their length in the holes of the roller body and, with the remainder of their length protruding above the surface of the roller body and holes in differently loaded part-regions of a width of the roller body different depths when the milling roller was new with holes in peripheral regions of the width of the roller body having a depth sufficient to receive profile-members when the peripheral regions are worn, the protruding portion of the profile-members and the surface of the roller body being at least partially worn when the milling roller is in the used state;

turning the worn surface of the roller body after worn profile-members in a part-region have been removed to such an extent that a desired shape of the roller body is produced;

b) placing profile-members whose length is smaller than profile-members in a new state into the holes of the peripheral regions.

* * * * *